(12) United States Patent
Mellot (10) Patent No.: US 8,189,054 B2
(45) Date of Patent: May 29, 2012

(54) MOTION ESTIMATION METHOD, DEVICE, AND SYSTEM FOR IMAGE PROCESSING

(75) Inventor: Pascal Mellot, Lans en Vercors (FR)

(73) Assignee: STMicroelectronics S.A., Montrouge (FR)

( * ) Notice: Subject to any disclaimer, the term of this patent is extended or adjusted under 35 U.S.C. 154(b) by 1749 days.

(21) Appl. No.: 11/300,683

(22) Filed: Dec. 14, 2005

(65) Prior Publication Data

US 2006/0159177 A1 Jul. 20, 2006

(30) Foreign Application Priority Data

Dec. 14, 2004 (FR) .................................... 04 13285

(51) Int. Cl.
*H04N 5/228* (2006.01)
*H04N 7/12* (2006.01)
*G06K 9/72* (2006.01)

(52) U.S. Cl. ............... 348/208.1; 348/208.2; 348/208.4; 348/208.6; 348/208.13; 375/240.16; 375/240.29; 382/236

(58) Field of Classification Search ............... 348/208.1, 348/208.2, 208.4, 431.1, 620, 699, 700, 155, 348/208.6, 208.13; 375/240.16, 240.29; 382/236

See application file for complete search history.

(56) References Cited

U.S. PATENT DOCUMENTS

2003/0161403 A1 * 8/2003 Yang ........................ 375/240.16
2003/0189548 A1 * 10/2003 Rovati et al. .................. 345/163
2004/0022320 A1 * 2/2004 Kawada et al. .......... 375/240.16

OTHER PUBLICATIONS

"Spatial-Temporal Motion Estimation for Image Reconstruction and Mouse Functionality with Optical or Capacitive Sensors", Rovati, F.S. et al., pp. 711-718, 49;3, Aug. 2003, XP 002338468.
Preliminary Search Report for French Application No. 04 13285 dated Jul. 29, 2005.

* cited by examiner

*Primary Examiner* — Jason Chan
*Assistant Examiner* — Joel Fosselman
(74) *Attorney, Agent, or Firm* — Lisa K. Jorgenson; Stephen Bongini; Fleit Gibbons Gutman Bongini & Bianco P.L.

(57) ABSTRACT

A motion estimation method is provided for processing successive images in an image sequence, with a motion vector being associated with each of the processed images. For a current image, motion vectors associated with images that precede the current image in the sequence are selected. Candidate motion vectors are generated from the motion vectors that are selected. A motion vector is elected from among the candidate motion vectors. Information that associates the elected motion vector with the current image is stored in memory. At least one of candidate motion vectors is an acceleration vector generated from the acceleration between first and second motion vectors averaged relative to a first and second images, with the first and second images being distinct and preceding the current image in the image sequence. A motion vector averaged relative to a given image is obtained from selected motion vectors associated with images preceding the given image.

23 Claims, 3 Drawing Sheets

MOTION ESTIMATION METHOD, DEVICE, AND SYSTEM FOR IMAGE PROCESSING

CROSS-REFERENCE TO RELATED APPLICATIONS

This application is based upon and claims priority from prior French Patent Application No. 04 13285, filed Dec. 14, 2004, the entire disclosure of which is herein incorporated by reference.

FIELD OF THE INVENTION

The present invention relates to motion estimation methods for processing an image sequence, especially an image sequence generated from images provided by a moveable image sensor, in order to detect the movement of an entity provided with this image sensor.

BACKGROUND OF THE INVENTION

There are many systems that use motion estimation methods. In certain systems for processing video or film images, the actual image rate (the number of images per second) is not sufficient for a quality image. Consequently, additional images are generated. It may be advantageous to generate such additional images by applying a method of estimating the motion of the objects in the actual images.

Such methods are conventionally also used in video data compression systems, such as systems based on the MPEG standard. Such systems are used to reduce the quantity of image data to be transmitted or stored, by compressing this data so as to allow it to be rapidly transferred to digital networks or even to telephone lines, or to allow it to be recorded on digital media. In practice, only certain reference images are encoded, and motion vectors are generated that encode the motion of objects between the encoded images and the suppressed images. The encoded images and the motion vectors are transmitted and then, on the receive side, the missing intermediate images are deduced from the motion vectors.

The field to which the present invention is particularly suited is that of data processing systems that include an entity provided with an image sensor, with the recorded images being processed in order to determine the motion of the entity.

Data processing systems are known in which a computer is connected to a mouse. Such systems are based on detecting the movements of the mouse. When the mouse is an optical mouse, the movement of the mouse is generally detected on the basis of data captured by a video sensor or another type of sensor that is fixed to the optical mouse.

Such sensors deliver a digital signal in the form of an image sequence captured during displacement of the mouse. This digital signal is then processed so as to deduce the movement of the mouse therefrom.

In general, the mouse is moved over a suitable surface and the video sensor fixed to the mouse captures images of this surface during its movement. The movement of the mouse can then be reconstructed from the relative positions of the successive images that were captured. An image sequence is therefore generated from the image sequence received from the sensor, with the relative position of the mouse being represented on each image of the sequence thus generated. Then, from the relative displacement of the mouse that corresponds to two successive images, the displacement that the mouse pointer on the computer screen should be given is deduced.

However, such image processing is complex. It requires massive calculations and is consequently expensive.

To be able to display the pointer of the optical mouse more easily, it is advantageous to apply a motion estimation method in such a context.

In general, with such a method, the images to be processed are divided into blocks of pixels and it is assumed that each block is substantially identical from one image to the other, even if this block has moved between two images.

Such a method can be used to estimate the motion of a given block of pixels from one image to a following image. This block-by-block motion estimation is generally represented by a motion vector which is associated with each of the blocks of an image. This vector represents the motion of a block of pixels from one image to another. It has a vertical component and a horizontal component that represent the displacement that has to be applied to a block of a preceding image in order to arrive at the position of a substantially identical block of pixels in a following image.

If the image sequence to be processed comes from an image sensor moving over a given surface, the motion of all the blocks of pixels of each image to be processed can be represented by a single motion vector.

Figure 1A:
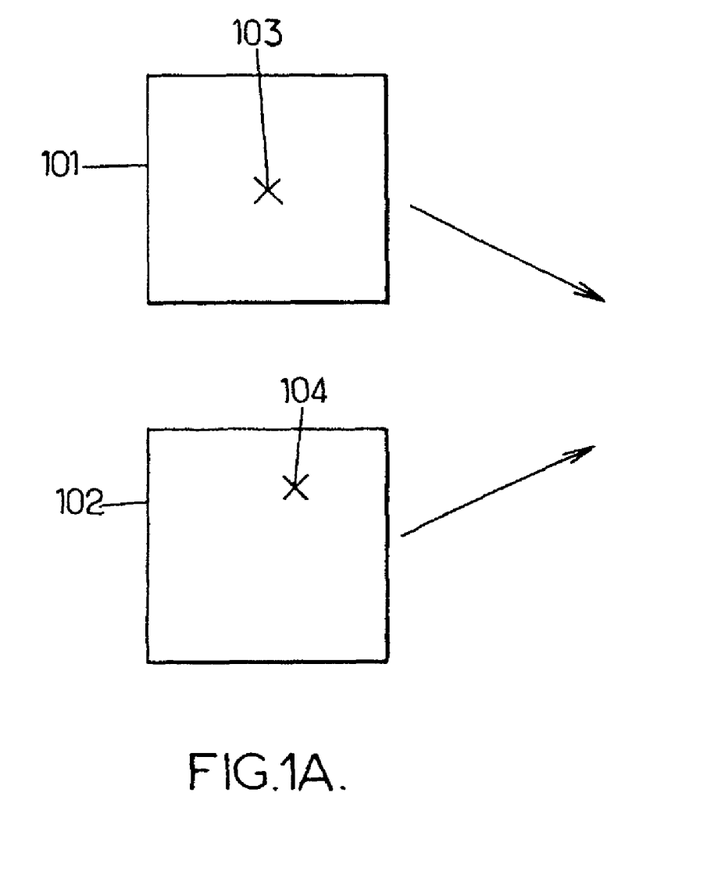
FIGS. 1A and 1B illustrate a motion vector in an application for detecting the movement of an optical mouse.
Figure 1B:
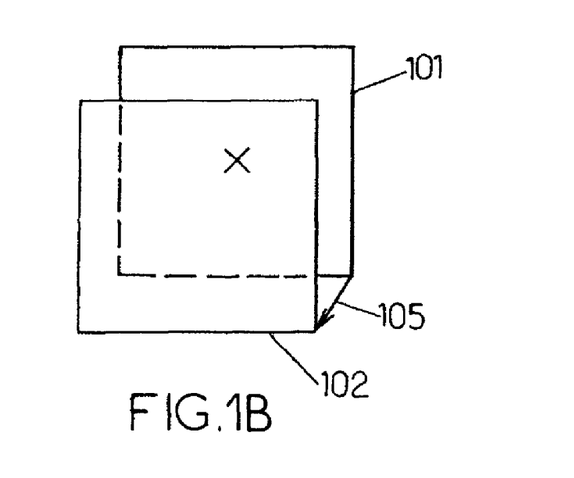

FIGS. 1A and 1B illustrate a definition of a motion vector. In FIG. 1A, a sequence of two images is shown—a first image 101 is followed by a second image 102. The position of the mouse is shown in each of these images. Thus, in the first image 101 the mouse is in position 103, and in the second image the mouse is in position 104.

In FIG. 1B, the images 101 and 102 are superposed in such a way that the respective positions of the mouse coincide. The motion vector corresponding to such a displacement is shown by the arrow 105. Its horizontal and vertical components are called X and Y. Thus, the movement of the mouse between the image 101 and the image 102 may subsequently be represented by the motion vector 105. Thus, the image 101 may be associated with the motion vector 105 that allows the position of the mouse to be found in the following image 102.

In order to estimate the associated movement of the mouse in a current image, the procedure is generally based on motion vectors previously associated with preceding images in the image sequence. Candidate vectors, that is to say vectors that can represent the movement of the mouse between two successive images, are then generated from such motion vectors. Next, the relevance of each of the candidate vectors is checked by well known mouse position correlation calculations. The candidate vector elected is the vector with the highest calculated correlation.

To summarize, for an image being processed, candidate vectors are generated and then a correlation of each of these candidate vectors is calculated so as to elect the candidate vector that has the best calculated correlation.

The term "processed images" refers to images for which a motion vector has been elected. The elected vector is then associated with the respective image.

To generate suitable candidate vectors, motion vectors are generally selected from among motion vectors associated beforehand with preceding images. To do this, each association of an image and the respective elected motion vector is stored in memory.

However, when the candidate motion vectors are not relevant, even if the one having the best correlation has been elected, such a system can diverge. Such a divergence often occurs following a sudden movement of the mouse.

Thus, the performance of devices that apply a motion estimation method is greatly dependent on the quality of the candidate motion vectors. Consequently, it is desirable to have available a method of generating candidate vectors that is effective and precise.

SUMMARY OF THE INVENTION

It is an object of the present invention to satisfy these requirements.

One embodiment of the present invention provides a method of motion estimation for processing successive images in an image sequence, with a motion vector being associated with each of the processed images. According to the method, there are selected motion vectors associated with images that precede a current image in the image sequence. Candidate motion vectors are generated from the motion vectors that are selected, and a motion vector is elected from among the candidate motion vectors. Information that associates the elected motion vector with the current image is stored. At least one of the candidate motion vectors is an acceleration vector that is generated from an acceleration between a first motion vector averaged relative to a first image and a second motion vector averaged relative to a second image. The first and second images are distinct and precede the current image in the image sequence. A motion vector averaged relative to a given image is obtained from selected motion vectors associated with images preceding the given image.

Another embodiment of the present invention provides a motion estimation device for processing successive images in an image sequence, with a motion vector being associated with each of the images processed. The device includes a selection unit, a generation unit, an election unit, and a memory. The selection unit selects motion vectors associated with images that precede a current image in the image sequence, and the generation unit generates candidate motion vectors from the motion vectors that are selected. The election unit elects a motion vector from among the candidate motion vectors, and the memory stores information that associates the elected motion vector with the current image. The candidate motion vectors generated by the generation unit include at least one acceleration vector that is generated from the acceleration between a first motion vector associated with a first image and a second motion vector associated with a second image. The first and second images precede the current image in the image sequence.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

One embodiment of the present invention provides a method of motion estimation for processing successive images in an image sequence, such that a motion vector is associated with each of the processed images. According to the method, for a current image, the following steps are performed. There are selected motion vectors associated with images that precede the current image in the sequence. Candidate motion vectors are generated from the motion vectors selected, and a motion vector is elected from among the candidate motion vectors. Information is stored that associates the elected motion vector with the current image. At least one of the candidate motion vectors is an acceleration vector generated from the acceleration between first and second motion vectors associated respectively with first and second separate images that precede the current image in the sequence.

In one embodiment of the present invention, in the selection step, the first and second motion vectors respectively associated with the first and second images that precede the current image in the image sequence are selected, with the first image being the image that immediately precedes the current image and the second image being the image that immediately precedes the first image. In the generation step, a difference between the first and second associated motion vectors is calculated in order to obtain the acceleration between the first and second motion vectors.

Preferably, in the selection step, an integral number i of motion vectors associated respectively with i images that precede the current image in the image sequence are also selected. In the generation step, a first motion vector averaged relative to the first image and a second motion vector averaged relative to the second image are calculated on the basis of all or some of the motion vectors selected. Additionally, in the generation step, a difference between the first averaged motion vector and the second averaged motion vector are calculated in order to obtain the acceleration between the first and second motion vectors.

It is also possible to add the first motion vector and the acceleration in order to obtain the candidate motion vector corresponding to the acceleration vector.

In some embodiments of the present invention, in the selection step, an integral number k of motion vectors associated respectively with k images that precede the current image in the image sequence is selected. In the generation step, an average of all or some of the k motion vectors selected is calculated in order to obtain an averaged candidate motion vector.

It is also possible, in the selection step, to select an integral number m of motion vectors associated with m images that precede the current image. In the generation step, a noise vector is advantageously defined. Advantageously, each of the selected motion vectors can then be added to the noise vector. For each motion vector selected, a respective noisy motion vector is obtained, and an average of the respective noisy motion vectors is calculated in order to obtain an averaged candidate motion vector.

Preferably, one of the candidate motion vectors corresponds to a zero motion vector.

Another embodiment of the present invention provides a motion estimation device for processing successive images in an image sequence, with a motion vector associated with each of the images processed. The device includes a selection unit, a generation unit, an election unit, and a memory. The selection unit selects motion vectors associated with images that precede a current image in the sequence, and the generation unit generates candidate motion vectors from the motion vectors selected. The election unit elects a motion vector from among the candidate motion vectors, and the memory stores information that associates the elected motion vector with the current image. The generation unit generates candidate motion vectors that include at least one acceleration vector generated from the acceleration between a first motion vector averaged relative to a first image and a second motion vector averaged relative to a second image. The first and second images are distinct and precede the current image in the image sequence. A motion vector averaged relative to a given image is obtained from selected motion vectors associated with images preceding the given image.

In one embodiment, the selection unit selects the first and second motion vectors associated respectively with the first and second images that precede the current image in the image sequence, with the first image being the image that immediately precedes the current image and the second image being the image that immediately precedes the first image. The generation unit calculates a difference between the first and second associated motion vectors in order to provide the acceleration between the first and second motion vectors.

Preferably, the selection unit selects an integral number i of motion vectors associated with i images that precede the current image in the image sequence. The generation unit calculates a first motion vector averaged relative to the first image and a second motion vector averaged relative to the second image on the basis of all or some of the motion vectors selected, in order to deduce therefrom a difference between the first averaged motion vector and the second averaged motion vector and to provide the acceleration between the first and second motion vectors.

By adding the first motion vector to the acceleration, the generation unit can then generate the candidate motion vector corresponding to the acceleration vector.

In one embodiment, the selection unit selects an integral number k of motion vectors associated respectively with k images that precede the current image in the image sequence, and the generation unit calculates an average of all or some of the k motion vectors selected, so as to generate an averaged candidate motion vector.

The selection unit may also select an integral number m of motion vectors associated with m images that precede the current image in the sequence. The generation unit adds each of the motion vectors selected to a noise vector, so as to generate, for each motion vector selected, a respective noisy motion vector and to provide an average of the respective noisy motion vectors so as to generate an averaged candidate motion vector.

Yet another embodiment of the present invention provides a motion estimation system comprising such a motion estimation device and a moveable entity provided with an image sensor.

A further embodiment of the present invention provides a method of tracking the path of a moveable sensor on the basis of images of a fixed environment that are generated by the sensor, with the method comprising the steps described above.

Still another embodiment of the present invention provides a device for tracking the path of a moveable sensor that implements such a method.

Another embodiment of the present invention provides a system for tracking the path of a moveable sensor comprising such a motion estimation device and a moveable entity provided with an image sensor.

Yet another embodiment of the present invention provides an optical mouse comprising a moveable image sensor and a motion estimation device that cooperate so as to implement such a method.

A further embodiment of the present invention provides a computer program product that can be loaded into the memory of a digital computer. The computer program product comprises software for executing the steps of such a method.

The present invention is applicable to any type of device or system that employs a motion estimation method. For example, such a method may advantageously be implemented in systems that include a light pen.

Exemplary embodiments of the present invention will now be described in detail with reference to FIGS. 2-4. These embodiments of the present invention are described in its application to optical mice. Of course, it is easy to deduce therefrom an application to any system in which a processing operation is applied to an image sequence in order to detect movements. The present invention may be advantageously employed in any type of device in which a motion estimation method is applied.

Figure 2:
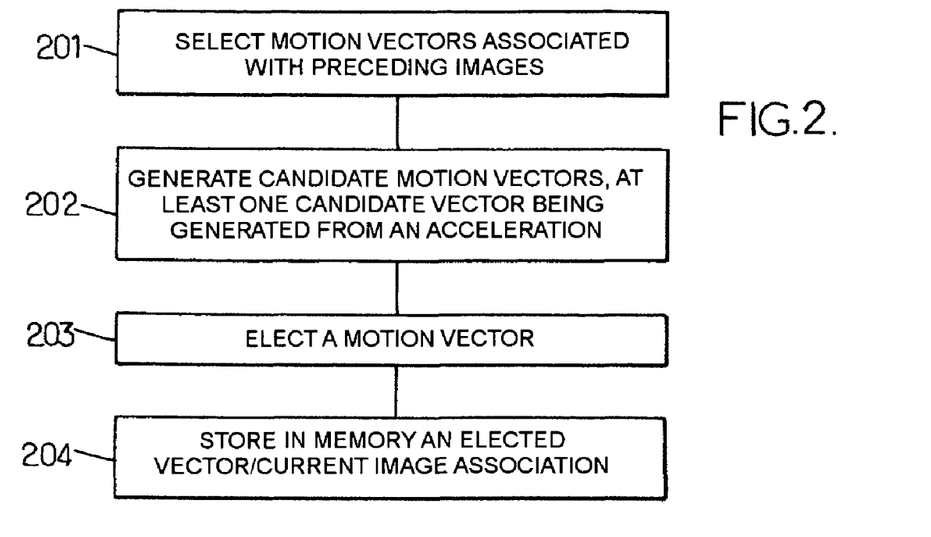
FIG. 2 illustrates steps of a motion estimation method according to one embodiment of the present invention.
Figure 2A:
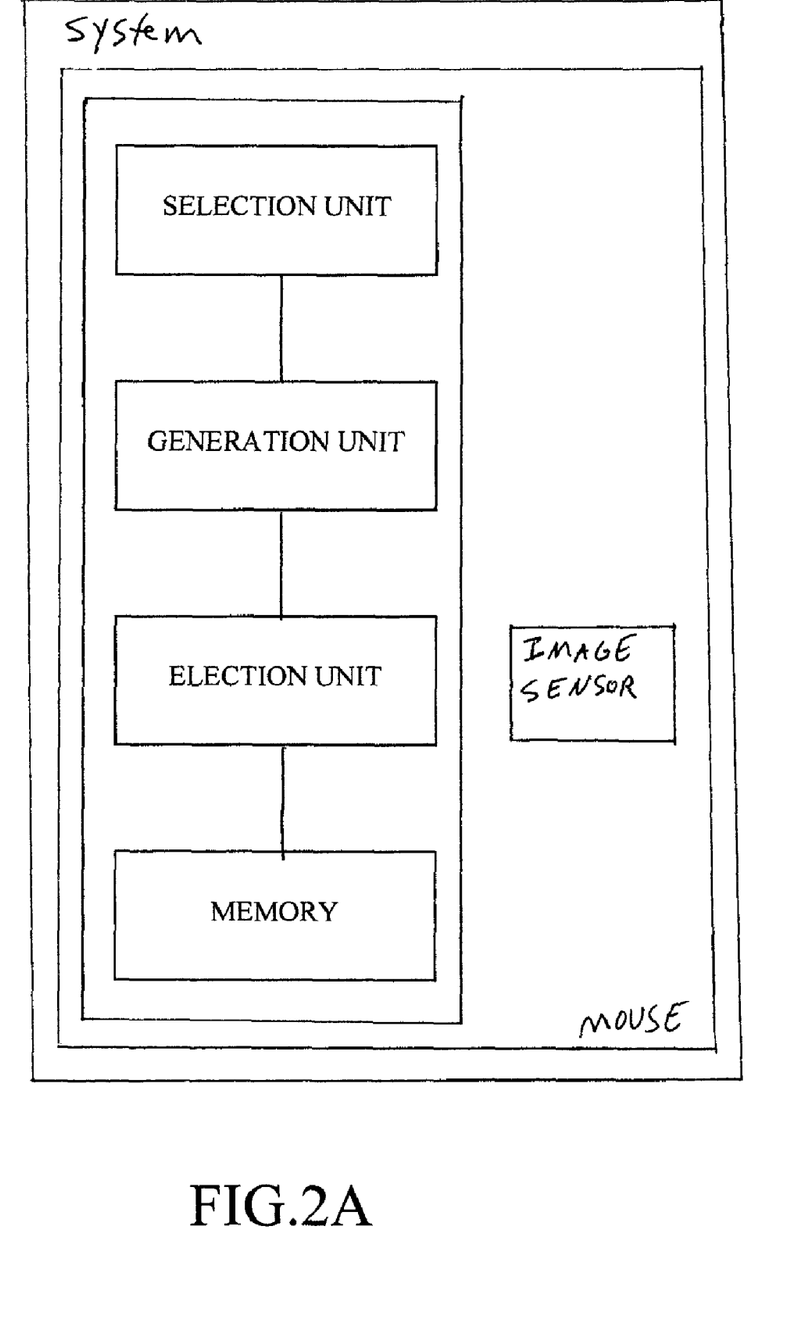

FIG. 2 illustrates steps of a motion estimation method according to one embodiment of the present invention.

On the basis of a selection 201 of motion vectors associated with preceding images, which represent the movements of the mouse relative to the preceding images, candidate motion vectors are generated in step 202. In this step, a motion vector acceleration is advantageously taken into account. More precisely, at least one candidate acceleration motion vector is generated that is obtained from a motion vector acceleration resulting from a difference between the motion vectors associated with two preceding images. It is noted that a "candidate acceleration vector" may be termed as an "acceleration vector".

Next, in step 203, the motion vector most suitable for representing the movement of the mouse is elected from among the candidate vectors obtained in the preceding step. Such an election comprises, in one embodiment of the present invention, a correlation calculation applied to each of the candidate vectors that was obtained. Such a calculation is well known and will not be explained in detail.

the term "correlation" refers to any calculation method for deducing the best fit between two images. To determine the relevance of a candidate vector relative to two images, one of the images is translated along the candidate vector in question.

The sum of the absolute differences of the respective pixels of the two images thus positioned may then be calculated.

It is also possible to correlate these two images along the candidate vector in question by calculating the sum of the squares of the differences. The present invention covers any correlation method for determining the relevance of a candidate vector relative to two images.

In step 204, the association of the elected vector with the current image is stored in memory so as to be able to select this elected vector for applying such a motion estimation method to following images.

The present invention covers various alternative ways of generating candidate vectors, in which at least one candidate vector is generated from a motion vector acceleration.

Thus, among the candidate vectors generated, at least one takes into account a motion vector acceleration. Such a characteristic is used to provide a more precise estimate and consequently to ensure better convergence of a motion estimation method. Below there is described various methods that can be used to obtain candidate acceleration motion vectors according to the present invention.

Moreover, other candidate vectors are then preferably generated in order to further improve the performance of the method.

Below there is also described several methods for obtaining relevant candidate vectors other than the acceleration candidate vectors.

It is then easy, from the acceleration candidate vectors and from other candidate vectors, to obtain various applications of the method using different ways of implementing the present invention. The present invention covers all methods in which one or more acceleration candidate vectors and one or more other candidate vectors are generated.

Several acceleration candidate vectors may therefore be generated. Hereafter, V(N) denotes the motion vector associated with the image N and $V_{acc.cand}(N)$ denotes an acceleration candidate vector corresponding to the Nth image in an image sequence in which the images are referenced in succession by 1, 2, . . . , N−2, N−1, N, . . . , where N is a strictly positive natural integer.

In one embodiment of the present invention, motion vectors associated with the two images that precede the image N being processed are selected. It is then useful to generate at least one acceleration candidate vector that satisfies the following equation.

$$V_{acc.cand}(N) = V(N-1) + \Delta$$

where $\Delta$ is a motion vector acceleration that satisfies the following equation.

$$\Delta = [V(N-1) - V(N-2)]$$

Figure 3:
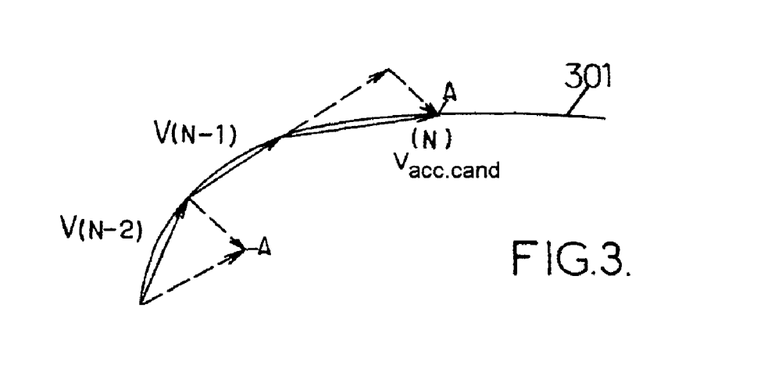
FIG. 3 illustrates the generation of an acceleration candidate vector according to one embodiment of the present invention.

FIG. 3 illustrates the generation of such an acceleration candidate vector. Curve 301 represents the path of the optical mouse. The vectors represented by the broken lines illustrate steps in the calculation. A vector V(N−2) represents the motion vector associated with the image N−2. A vector V(N−1) represents the motion vector associated with the image N−1. An acceleration A corresponding to the difference between V(N−1) and V(N−2) is determined. A corresponding acceleration candidate vector $V_{acc.cand}(N)$ relating to the image N is obtained by adding the acceleration $\Delta$ to the vector associated with the image N−1.

Other acceleration candidate vectors may also be relevant. For this, it may be advantageous to select the motion vectors associated with images further back in the image sequence in question.

For example, in some embodiments the motion vectors associated with a number i of images that precede the current image may be selected. In this case, an averaged motion vector relating to each of the images N−i to N−1 is stored. Such an averaged motion vector relating to the image N is denoted by $V_{av}(N)$, and it can be expressed for example by the following equation.

$$V_{av}(N) = \left[\sum_{k=1}^{i} V(N-k) + 2\right] \gg 2$$

Of course, such an averaged vector may be obtained using various equations for combining the motion vectors associated respectively with the i images that precede the current image.

When i is chosen to be equal to 4, a useful compromise is obtained between the cost incurred by the calculations and the performance of such a method. However, it may be advantageous in certain applications to consider averaged vectors that correspond to images further back in the image sequence in question.

It is then possible to generate, on the basis of averaged vectors, an acceleration candidate vector that satisfies the following equation.

$$V_{acc.cand}(N) = V_{av}(N-1) + \Delta$$

where $\Delta$ is a motion vector acceleration that satisfies the following equation.

$$\Delta = [V_{av}(N-1) - V_{av}(N-2)]$$

In some embodiments of the present invention, candidate motion vectors other than acceleration motion vectors are also generated.

The motion vector corresponding to the zero vector is advantageously generated as a candidate vector in one embodiment of the present invention. This makes it possible in certain cases to avoid any divergence.

It is also useful to generate one or more candidate vectors directly from motion vectors associated with images that precede the current image. More precisely, these candidate vectors are selected motion vectors. For example, the motion vector associated with the image that precedes the current image and the motion vector associated with the image that precedes the preceding image may be considered as being two candidate vectors. However, it is also possible to consider motion vectors associated with images that are further back in the sequence as being candidate vectors.

It is then also possible to generate averaged candidate vectors such as those defined above with reference to the generation of certain acceleration candidate vectors.

Thus, it is possible to generate an averaged candidate vector, denoted by $V_{av.cand}(N)$ and given by the following equation.

$$V_{av.cand}(N) = \left[\sum_{k=1}^{i} V(N-k) + 2\right] \gg 2$$

When i is chosen to be equal to 4, a useful compromise is achieved between the cost incurred by the calculations and the performance of such a method.

In one embodiment of the present invention, several averaged candidate vectors are generated. A noise vector is added to a selected motion vector so as to ensure better convergence of the method by introducing noise.

A noise vector may be randomly chosen. In one method, eight noise vectors are defined.

Figure 4:
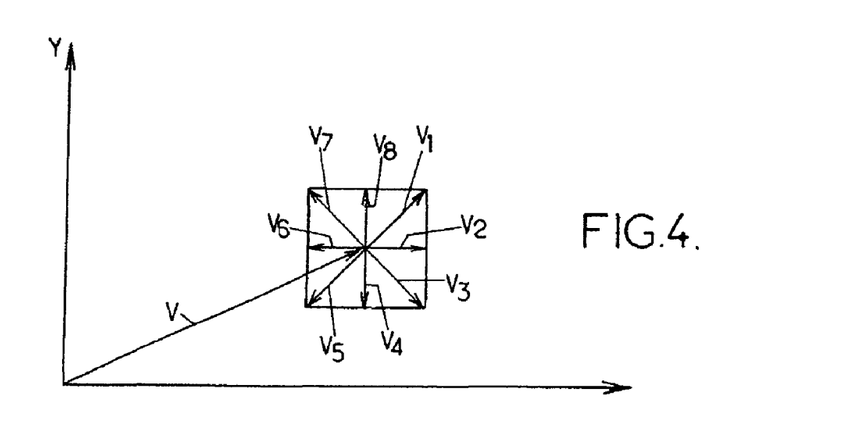
FIG. 4 illustrates the generation of candidate vectors based on application of noise vectors according to one embodiment of the present invention.

FIG. 4 illustrates noise vectors applied to a selected motion vector. Advantageously, eight noise vectors are thus defined, denoted by $V_1$-$V_8$. One or more noisy vectors $V_{noise}$ may then be obtained for a motion vector selected. Thus, relative for example to the image N−1, for a noise vector $V_j$, where j is between 1 and 8, the following noisy motion vector is obtained.

$$V_{noise,j}(N-1) = V(N-1) + V_j$$

It may also be useful to generate averaged candidate vectors from all or some of the noisy vectors that satisfy the above equation.

Such averaged candidate motion vectors may then, for example, be expressed in the form of the following equation.

$$V_{av.cand}(N) = \left[\sum_{j}\sum_{k=1}^{i} V_{noise,j}(N-k) + 2\right] \gg 2$$

Such averaged candidate vectors may also be used to generate acceleration candidate vectors.

The present invention allows more precise motion estimation and consequently better rendering of the movement of the optical mouse over a screen, especially in the case of rapid movements of the mouse. Advantageously, the present invention may be implemented in any motion estimation method.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method of motion estimation for processing successive images in an image sequence, a motion vector being associated with each of the processed images, the method comprising the steps of:
    selecting i motion vectors associated with i images that precede a current image in the image sequence, i being an integer that is greater than 1;
    generating, by a processor, candidate motion vectors from the motion vectors that are selected;
    electing a motion vector from among the candidate motion vectors; and
    storing information that associates the elected motion vector with the current image,
    wherein in the generating step, at least one of the candidate motion vectors that is generated is an acceleration vector that is generated from an acceleration between a first averaged motion vector for a first image and a second averaged motion vector for a second image,
    the first averaged motion vector is a motion vector generated from motion vectors associated with a plurality of images that precede the first image,
    the second averaged motion vector is a motion vector generated from motion vectors associated with a plurality of images that precede the second image,
    in the generating step, the acceleration between the first averaged motion vector and the second averaged motion vector is the difference between the first averaged motion vector and the second averaged motion vector,
    the first and second images are distinct and precede the current image in the image sequence, and
    the averaged motion vector for image N is $V_{av}(N)$ and is given by the following equation:

$$V_{av}(N) = \left[\sum_{k=1}^{i} V(N-k) + 2\right] \gg 2.$$

2. The method according to claim 1, wherein in the selecting step, the first and second motion vectors are selected, the first image being the image that immediately precedes the current image and the second image being the image that immediately precedes the first image.

3. The method according to claim 2, wherein in the generating step, the first averaged motion vector and the acceleration are added in order to obtain the acceleration vector.

4. The method according to claim 1,
    wherein in the selecting step, an integral number k of motion vectors associated with k images that precede the current image in the image sequence is selected, and
    the generating step comprises calculating an average of all or some of the k motion vectors that are selected in order to obtain an averaged candidate motion vector.

5. The method according to claim 1, wherein one of the candidate motion vectors corresponds to a zero motion vector.

6. A non-transitory computer readable medium encoded with a computer program, the computer program comprising instructions for performing the method according to claim 1.

7. The method according to claim 1, wherein the first averaged motion vector is generated from motion vectors associated with at least four images that precede the first image.

8. The method according to claim 1, wherein in the generating step, the acceleration vector $V_{acc.cand}(N)$ is given by the following equation:

$$V_{acc.cand}(N) = V_{av}(N-1) + \Delta,$$

where $\Delta$ is a motion vector acceleration given by the following equation:

$$\Delta = [V_{av}(N-1) - V_{av}(N-2)].$$

9. A method of motion estimation for processing successive images in an image sequence, a motion vector being associated with each of the processed images, the method comprising the steps of:
    selecting i motion vectors associated with i images that precede a current image in the image sequence, i being an integer that is greater than 1;
    generating, by a processor, candidate motion vectors from the motion vectors that are selected;
    electing a motion vector from among the candidate motion vectors; and
    storing information that associates the elected motion vector with the current image,
    wherein in the generating step, at least one of the candidate motion vectors that is generated is an acceleration vector that is generated from an acceleration between a first motion vector averaged relative to a first image and a second motion vector averaged relative to a second image,
    the first and second images are distinct and precede the current image in the image sequence,
    a motion vector averaged relative to a given image is a motion vector obtained from selected motion vectors associated with images preceding the given image, and
    the generating step comprises:
        defining a noise vector; and
        adding each of the motion vectors that are selected to the noise vector, so as to obtain for each motion vector that is selected a respective noisy motion vector.

10. The method according to claim 9, wherein the generating step further comprises:
    calculating an average of the respective noisy motion vectors in order to obtain an averaged candidate motion vector.

11. The method according to claim 10, wherein in the selecting step, an integral number m of motion vectors associated with m images that precede the current image is selected.

12. A system for processing successive images in an image sequence, a motion vector being associated with each of the images processed, the system comprising:

a selection unit for selecting motion vectors associated with images that precede a current image in the image sequence;
a generation unit for generating candidate motion vectors from the motion vectors that are selected;
an election unit for electing a motion vector from among the candidate motion vectors; and
a memory for storing information that associates the elected motion vector with the current image,
wherein the candidate motion vectors generated by the generation unit include at least one acceleration vector that is generated from the acceleration between a first averaged motion vector for a first image and a second averaged motion vector for a second image,
the first averaged motion vector is a motion vector generated from motion vectors associated with a plurality of images that precede the first image,
the second averaged motion vector is a motion vector generated from motion vectors associated with a plurality of images that precede the second image,
the acceleration between the first averaged motion vector and the second averaged motion vector is the difference between the first averaged motion vector and the second averaged motion vector,
the first and second images are distinct and precede the current image in the image sequence, and
the averaged motion vector for image N is $V_{av}(N)$ and is given by the following equation:

$$V_{av}(N) = \left[\sum_{k=1}^{i} V(N-k) + 2\right] \gg 2.$$

13. The system according to claim 12, wherein the selection unit selects the first and second motion vectors, the first image being the image that immediately precedes the current image and the second image being the image that immediately precedes the first image.

14. The system according to claim 12, wherein the generation unit adds the first averaged motion vector to the acceleration in order to generate the acceleration vector.

15. The system according to claim 12,
wherein the selection unit selects an integral number k of motion vectors associated with k images that precede the current image in the image sequence, and
the generation unit calculates an average of all or some of the k motion vectors that are selected, so as to generate an averaged candidate motion vector.

16. An optical mouse comprising the system according to claim 12.

17. A data processing system comprising:
the system according to claim 12; and
a moveable entity provided with an image sensor.

18. A system for processing successive images in an image sequence, a motion vector being associated with each of the images processed, the system comprising:
a selection unit for selecting motion vectors associated with images that precede a current image in the image sequence;
a generation unit for generating candidate motion vectors from the motion vectors that are selected;
an election unit for electing a motion vector from among the candidate motion vectors; and
a memory for storing information that associates the elected motion vector with the current image,
wherein the candidate motion vectors generated by the generation unit include at least one acceleration vector that is generated from the acceleration between a first motion vector averaged relative to a first image and a second motion vector averaged relative to a second image,
the first and second images are distinct and precede the current image in the image sequence,
a motion vector averaged relative to a given image is obtained from selected motion vectors associated with images preceding the given image, and
the generation unit adds each of the motion vectors that are selected to a noise vector, so as to generate, for each motion vector selected, a respective noisy motion vector.

19. The system according to claim 18, wherein the generation unit calculates an average of the respective noisy motion vectors so as to generate an averaged candidate motion vector.

20. A method of tracking the path of a moveable sensor, the method comprising the steps of:
providing a moveable sensor that generates an image sequence of a fixed environment, the image sequence comprising successive images;
selecting motion vectors associated with images that precede a current image in the image sequence;
generating candidate motion vectors from the motion vectors that are selected;
electing a motion vector from among the candidate motion vectors; and
storing information that associates the elected motion vector with the current image,
wherein in the generating step, at least one of the candidate motion vectors that is generated is an acceleration vector that is generated from an acceleration between a first averaged motion vector for a first image and a second averaged motion vector for a second image,
the first averaged motion vector is a motion vector generated from motion vectors associated with a plurality of images that precede the first image,
the second averaged motion vector is a motion vector generated from motion vectors associated with a plurality of images that precede the second image,
in the generating step, the acceleration between the first averaged motion vector and the second averaged motion vector is the difference between the first averaged motion vector and the second averaged motion vector,
the first and second images are distinct and precede the current image in the image sequence, and
the averaged motion vector for image N is $V_{av}(N)$ and is given by the following equation:

$$V_{av}(N) = \left[\sum_{k=1}^{i} V(N-k) + 2\right] \gg 2.$$

21. A system comprising a processor programmed to:
select motion vectors associated with images that precede a current image in the image sequence;
generate candidate motion vectors from the motion vectors that are selected;
elect a motion vector from among the candidate motion vectors; and
store information that associates the elected motion vector with the current image,
wherein at least one of the candidate motion vectors that is generated is an acceleration vector that is generated from an acceleration between a first averaged motion vector for a first image and a second averaged motion vector for a second image, the first averaged motion vector is a motion vector generated from motion vectors associated with a plurality of images that precede the first image, the second averaged motion vector is a motion vector generated from motion vectors associated with a plurality of images that precede the second image, the acceleration between the first averaged motion vector and the second averaged motion vector is the difference between the first averaged motion vector and the second averaged motion vector, the first and second images are distinct and precede the current image in the image sequence, and the averaged motion vector for image N is $V_{av}(N)$ and is given by the following equation:

$$V_{av}(N) = \left[ \sum_{k=1}^{i} V(N-k) + 2 \right] \gg 2.$$

22. A data processing system comprising:
the system according to claim 21; and
a moveable entity provided with a movable sensor.

23. An optical mouse comprising the system according to claim 21.

* * * * *